United States Patent [19]
Otzen et al.

[11] Patent Number: 4,555,831
[45] Date of Patent: Dec. 3, 1985

[54] CATCH FOR SAFETY BELTS OF AIR, WATER, AND LAND TRANSPORT MEANS

[76] Inventors: Uwe Otzen, Eisenbahnstr. 16, 7210 Rottweil; Karl Wild, Mariazeller Str. 5, 7230 Schramberg, both of Fed. Rep. of Germany

[21] Appl. No.: 489,108

[22] Filed: Apr. 27, 1983

[30] Foreign Application Priority Data

May 7, 1982 [DE] Fed. Rep. of Germany ....... 3217082
Sep. 17, 1982 [DE] Fed. Rep. of Germany ....... 3234486

[51] Int. Cl.$^4$ ............................................. A44B 11/26
[52] U.S. Cl. ..................................... 24/603; 280/801; 297/468
[58] Field of Search .................. 24/602, 603; 297/468, 297/480, 477; 280/801; 180/268

[56] References Cited
U.S. PATENT DOCUMENTS 3,235,930  2/1966  Chapin et al. .................. 297/468 X
3,311,188  3/1967  Gutshall .............................. 24/603 X
4,049,293  9/1977  Bouju ................................ 280/801 X
4,126,919  11/1978  Lassche .............................. 24/602
4,194,764  3/1980  Grimm .............................. 24/602 X
4,441,236  4/1984  Bron ................................. 24/602 X Primary Examiner—Philip C. Kannan
Attorney, Agent, or Firm—Lackenbach, Siegel, Marzullo, Presta & Aronson

[57] ABSTRACT

An improved catch for safety belts embodying releasable locking of the catch tongue with a releasing element which by means of a pushbutton is manually movable to slide counter to a return spring and release a locking mechanism, and an automatic release system controlled by an electric signal generated by a sensor and having an electro-mechanical drive. The automatic release operation occurring after a given delay period, which starts anew after each signal, if several signals occur successively within the delay period. The electromechanical drive comprising a gear motor driven threaded spindle, and a drag nut on the spindle bearing against the releasing element. The drag nut releasing said releasing element for movement by the pushbutton. A switching element is provided which, upon release of the locking mechanism, acts on the gear motor to restore it to its starting condition prior to the electrical signal generated by the sensor.

8 Claims, 4 Drawing Figures

CATCH FOR SAFETY BELTS OF AIR, WATER, AND LAND TRANSPORT MEANS

FIELD OF THE INVENTION

The invention relates to a catch for safety belts of air, water, and land transport means by means of releasable locking of the catch tongue with a releasing element which is manually movable by a pushbutton to slide counter to the force of a return spring and at the end of its movement path releases the locking mechanism, and with an automatic release system controllable by an electric signal generated by a sensor and having an electromechanical drive which acts on the releasing element for traction counter to the pushbutton. The automatic release occurs upon the electric signal being generated by the sensor after a given delay period, and this delay period starting anew after each signal if several signals occur successively within the delay period.

BACKGROUND OF THE INVENTION

A catch of this kind is known from Swiss Pat. No. 618,049. In the case of this known catch, the snapped-in catch tongue is locked by the pivotably mounted releasing element. On the one hand, the releasing element can be pushed manually out of the locking position by means of the pushbutton. On the other hand, the releasing element can be pivoted out of the locking position by a releasing lever under spring tension. The releasing lever is normally fixed and can be released for automatic opening of the catch by means of a solenoid plunger when the latter is energized by an electric signal. The electric signal is generated in case of an accident-related impact by an inertia sensor. The electric signal generated by the inertia sensor is delayed electronically by a given period of about 8 seconds, for example, in order that, in case of an accident, the catch will open only after the accident is over. Since in an accident often several shocks occur in succession, the person must be sure to be held by the safety belt also during the following shocks. For this purpose, in the case of several impacts succeeding one another within the delay period, the delay period is started anew by the respective electric signal of the inertia sensor, so that also after the last impact the full delay period expires before the catch is automatically opened.

In the case of this known catch, the releasing lever must be brought back to its fixed position manually after each automatic release. If for instance for checking its functionality the catch is released automatically and when later closing the catch the user forgets to snap in the releasing lever manually, automatic release of the catch is not possible. The safety of operation of the catch is, therefore, not positively ensured.

The automatic release by means of the solenoid plunger and releasing lever is expensive to construct and requires a special design of the locking and of the opening mechanism of the catch. It is not possible to use the automatic release in connection with a time-tested and reliable design of a manually releasable catch.

From U.S. Pat. No. 3,311,188 a catch is known where for locking the catch tongue a wedge-shaped slider holds two relatively pivotable levers in engagement with the catch tongue. On the one hand, for manual opening of the catch, the slider can be moved by pushing by means of a pushbutton, and on the other hand, for automatic opening of the catch, it can be moved by pulling by means of a solenoid plunger acting on the opposite side. Through the movement of the slider, the latter releases the two levers, so that they are pivoted out of the locking position by means of an extension spring.

Also in this known catch the design of the opening mechanism is adapted specifically to automatic release. The automatic release, therefore, cannot be combined with a reliable, time-tested design of a manually releasable opening mechanism. The extension spring which pivots the locking levers out of the catch tongue must be very strong to be able to open the catch also when the catch is under a high tensile stress e.g. by the weight of the strapped person. The strong extension spring in turn causes strong friction between the slider and the locking levers, which must be overcome by the solenoid plunger. Therefore the solenoid plunger must be very large and hence expensive and bulky to ensure reliable automatic release.

From German Patent Disclosure DE-OS No. 23 63 973 an automatically releasing catch for safety belts is known. Here a bow or shackle connected with the safety belt is held by a plier. The plier is fitted to a nut which is displaceable by means of a threaded spindle driven by an electric motor. By displacing the nut, the plier is pushed against a stop and is opened by the latter. Opening of the catch occurs with a time delay relative to the accident-related shock that causes the starting of the motor, the delay period being determined by the duration of the displacement of the nut on the threaded spindle.

This known automatically opening catch is an independent structural unit which is not combined with a manually operable opening mechanism. The automatic releasing process is triggered in an accident by the first shock; resetting of the delay period in the case of several successive shocks is not possible. There is danger, therefore, that at the time of a later shock following the first shock the catch is already open. Lastly, after automatic release, e.g. for checking the functionality, the plier must be moved back into its closing position by manual turning of the threaded spindle.

SUMMARY AND OBJECTS OF THE INVENTION

It is the object of the invention to improve a manually and automatically openable catch of the initially mentioned kind in such a way that after having been opened it necessarily returns to its position ready for renewed locking, and that the automatic release is usable in combination with a time-tested reliable manually actuable release of the locking mechanism without having to change the latter.

According to the invention, this problem is solved in that the electro-mechanical drive is a gear motor with a threaded spindle, that the releasing element is freely movable relative to the threaded spindle, that on the threaded spindle a drag nut (traveling nut) which takes along the releasing element and releases it for the pushing movement is fitted, that the releasing element bears against the drag nut under spring tension, and that a switching element which upon release of the locking mechanism acts on the gear motor is provided.

Advantageous forms of realization and developments of the invention are indicated in the sub-claims.

In the catch according to the invention, the gear motor which brings about the automatic opening engages the releasing element via the threaded spindle and the drag nut, pulling the releasing element in the same movement path as is the case in manual actuation by pushing. It is therefore not necessary to change the unlocking mechanism and its manual release by the pushbutton. Release of the unlocking mechanism occurs in identical manner when the releasing element is displaced manually from one side by pressure or from the opposite side by means of the gear motor by traction. The pulling drive by means of the drag nut frees the releasing member for the movement in manual actuation, so that independently of the automatic release also manual opening of the catch is always possible.

As the unlocking mechanism and the releasing element releasing it have not been changed, the automatic actuation can be employed in any desired conventional catch. In particular, the automatic release can be used in conjunction with manually operable conventional catches whose locking and unlocking mechanism has already proved successful and complies with all safety regulations.

The gear motor is set in operation by the electric signal of a sensor, in particular of an inertia sensor. By the gear reduction of the gear motor it is achieved that a small motor of small torque, which does not substantially affect the structural dimensions of the catch, is sufficient to exert a strong traction on the releasing element. This strong traction is necessary, as it may be necessary to open the catch automatically also when it is under high tensile load, for instance because an injured or unconscious person hangs in the harness.

In a first embodiment of the invention, the drag nut is in engagement with the threaded spindle only over less than half the circumference and can be lifted off the spindle. The drag nut is provided at one arm of a rocker, the other arm of which engages an electromagnet excitable by the electric signal of the sensor.

In this embodiment it is achieved by the step-down transmission of the gear motor and the pitch of the threaded spindle that the tripping of the unlocking mechanism at the end of the displacement path of the releasing element occurs only after the desired delay period. In order that even in case of several successive impingement shocks the entire delay period expires after the last shock, the drag nut can be lifted off the threaded spindle. By the lifting off of the drag nut the latter disengages from the threaded spindle, so that the releasing element can be brought back to its starting position by the return springs. The opening of the drag nut is triggered by the electric signal of the inertia sensor, so that the drag nut is opened with each shock impulse by an impingement during the course of the accident and the pulling movement of the releasing element by the gear motor begins again from the starting position of the releasing element over the entire movement path and hence over the entire delay period. The drag nut is lifted off the threaded spindle by the rocker when the electromagnet actuating the rocker is excited by the electric signal of the inertia sensor.

Preferably there is provided at the end of the movement path of the releasing element, as switching element, a limit switch actuated by the releasing element. By this limit switch, for one thing, the current supply to the gear motor can be cut off when the catch is released automatically. Preferably also a signal which excites the electromagnet is generated by this limit switch, so that after release of the catch also the drag nut is disengaged and the releasing element necessarily resumes its starting position for renewed locking.

In another embodiment of the invention, the direction of rotation of the gear motor is reversible and the reversal can be triggered each time at the ends of the movement path of the drag nut, to positively bring the catch back to its starting position ready for use after an automatic release.

The drag nut is captive on the threaded spindle. Upon automatic release of the locking mechanism, the drag nut bears under pressure against the cross-yoke connected with the releasing element. As a relative movement between the drag nut and the cross-yoke does not occur, no friction forces need be overcome—in contrast to the first embodiment—when the catch is under high tensile load. The gear motor, therefore, must overcome only the locking forces.

The delay period between the generation of the signal by the inertia sensor and the release of the locking mechanism by the automatic releasing system is brought about by an electronic delay element. The gear motor is started only after expiration of the delay period of this element and only then brings about the displacement of the releasing element by means of the drag nut. If due to multiple shocks in the course of an accident several signals of the inertia sensor occur successively, the electronic delay element is reset and the preset delay period starts to run anew before the gear motor is set in motion. Thus a partial unlocking of the catch tongue which would reduce the holding force of the catch during subsequent shocks cannot occur. The catch remains unchanged in its fully locked starting state with maximum holding force until the full preset delay period has expired.

The electronic delay element which brings about the delay period and the resettability may be accommodated outside the catch housing, so that it does not affect the structural dimensions of the catch.

As soon as the drag nut has, in automatic release, pulled the releasing element to the end of its movement path, so that the locking mechanism is released, the direction of rotation of the gear motor is reversed, so that the drag nut is immediately moved back into its starting position and the catch is operative for renewed locking. The pushbutton and the releasing element are then moved back to their starting position by the return springs. The catch is thus necessarily functional at all times without requiring any additional measures on the part of the user. There is no possibility that locking does not occur or occurs incompletely because the user, out of ignorance or forgetfulness, fails to carry out any measures necessary to that end or does so insufficiently.

Reversal of the gear motor is brought about preferably by switching elements in the form of limit switches which are disposed at the ends of the movement path of the drag nut. The limit switches are preferably contactless proximity switches, as these do not require any force and have small dimensions. Also mechanical microswitches can be used.

It is possible also to establish the end positions of the drag nut by electronic means. To this end, an electric signal which brings about the reversal of the direction of rotation can be derived from the increase in current consumption of the gear motor when the drag nut is retained by a stop at the ends of its movement path.

Likewise it is possible to electronically count the number of revolutions of the gear motor or of the threaded spindle or the running time of the gear motor and to reverse the direction of rotation of the gear motor after a given number of revolutions or a given running time.

The functions of the resettable electronic delay element are preferably performed by a micro-processor. The micro-processor permits great versatility combined with a minimum requirement of space and energy. In addition to an inertia sensor which responds to acceleration upon accident-related impingement, additional sensors may be provided which respond to heat or fire and water. The electric signals of the sensors for fire and water were lead via the micro-processor to immediate activation of the automatic release system without time delay. Also the reversal of the direction of rotation of the gear motor and optionally the counting of the revolutions of the gear motor or of the spindle or of the running time of the gear motor may be taken over by the micro-processor.

In some cases it is desirable that the catch of the safety belt should not open automatically after an accident when an unconscious person hangs in the harness, so as not to cause additional injuries to this person as the catch opens. To meet this requirement, there may be provided at the catch a strain gauge which responds to the tensile load on the catch caused by the body weight of the person hanging in the harness. If this tensile load acting on the strain gauge exceeds a given value, the current supply to the gear motor is interrupted, so that the automatic release process does not continue. Not until the tensile load lets up is current supplied to the gear motor again, so that the automatic release process can run its course. In the first embodiment, the electromagnet acting on the rocker of the drag nut can additionally be excited as long as the tensile load exceeds the preset value. The drag nut is therefore maintained out of engagement until the tensile load diminishes again. The releasing element is then brought back to its starting position, so that after elimination of the tensile load the total delay period elapses again.

For the current supply to the gear motor one uses as a rule the supply system on board. Since in an accident it may happen in exceptional cases that also the supply system on board fails entirely e.g. through destruction of the battery or short-circuit, as a safety measure a storage battery or a capacitor may be inserted in the current supply to the gear motor and to the sensor. For reasons of cost and especially of spaced, a storage battery cell of low voltage is sufficient for the small d-c gear motor. This low voltage is sufficient for operating the d-c gear motor even in case of total failure of the power supply on board. While at this low voltage the gear motor runs more slowly, this means only an insignificant delay in the unlocking of the catch.

The automatic actuation of the releasing element according to the invention can be added to a conventional manually releasable catch without changing the design thereof. The automatic actuation according to the invention requires little cost of construction and takes little space. In particular for the second form of realization it would suffice to accommodate in the catch housing the gear motor with the threaded spindle and optionally the limit switches. Because of their small dimensions, these few parts increase the size of the catch housing only insignificantly as compared with a conventional catch.

BRIEF DESCRIPTION OF THE DRAWINGS

In the following, the invention will be explained more specifically with reference to embodiment examples illustrated in the drawing, in which.

DESCRIPTION OF THE PREFERRED EMBODIMENTS

Figure 1:
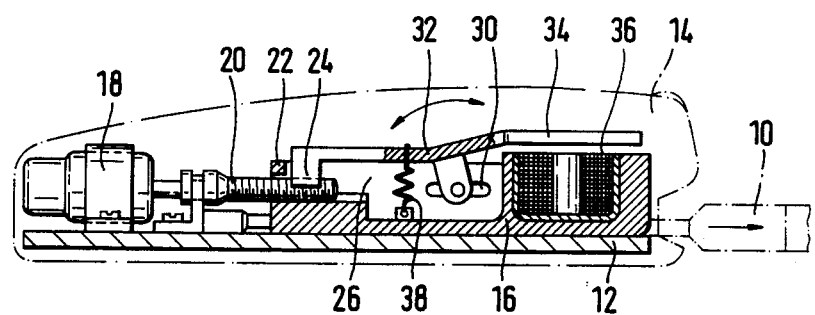
FIG. 1 shows a vertical longitudinal section through a catch according to a first embodiment.

Only the parts essential to the elucidation of the invention are illustrated in the drawing. In particular, the sensor which generates the electric signal is not shown. As has been stated above, this sensor may be of any design; essential is only its property to generate an electric signal or respectively to take over the switching function for the closing of circuits. The usable sensors belong to the state of the art known per se.

Further, the design of the catch tongue, its locking in the catch, the unlocking mechanism and its release by the releasing element are not illustrated. As has been stated above, these parts may be of any desired conventional design.

Figure 2:
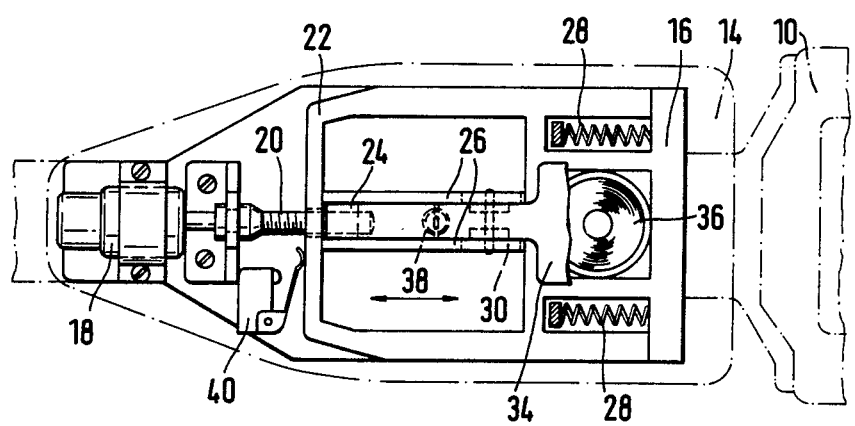
FIG. 2, a plan view of this catch.

In the first embodiment illustrated in FIGS. 1 and 2, the catch tongue 10 firmly attached to the belt engages (latches) in a manner not shown in the catch indicated only schematically by its base plate 12 and housing 14. The latching of tongue 10 is unlocked by an unlocking mechanism not shown, so that the tongue can be ejected.

A releasing element 16 is displaceably mounted on the base plate 12. The releasing element 16 is displaceable from its right end position shown in the drawing to the left, into an end position in which it releases the unlocking mechanism for release of tongue 10. To open the catch manually, the releasing element 16 is displaced by depression of a pushbutton not shown, in a manner known in itself. The pushbutton acts directly or through a lever in a pushing manner on the tongue-side end of the releasing element 16.

On the end of base plate 12 opposite tongue 10, a small d-c gear motor 18 is mounted. Through a reduction gear the gear motor 18 drives a threaded spindle 20 as soon as its current supply is switched on in the above described manner by the electric signal of the sensor. Spindle 20 passes freely through a vertical edge 22 of the releasing element 16 at the end thereof turned toward the gear motor 18. Inside the releasing element 16 a drag nut 24 is seated on the threaded spindle 20. The drag nut is guided slidingly between two guides 26 of the releasing element 16 extending in the displacement direction of the releasing element. Return springs 28, which are arranged between the releasing element 16 and the catch housing, hold the releasing element 16 applying its edge 22 against the drag nut 24. When actuated manually, the releasing element 16 is displaced to the left in the drawing, counter to the force of the return springs 28. The vertical edge 22 of the releasing element 16 is then lifted off the drag nut 24, which moves slidingly in the guides 26. The manual actuation of the releasing element 16 and hence the manual release of the unlocking mechanism is thus not impeded. In slots 30 of the guides 26, the pivot axle of a two-arm rocker 32 is displaceably mounted. At one arm of the rocker the drag nut 24 is provided, while the other arm of rocker 32 is formed as an armature plate 34, which is located opposite an electromagnet 36 fitted in the releasing element 16. By a spring 38 the rocker is prestressed in such a way that the drag nut 24 is maintained in engagement with the threaded spindle 20.

When the electromagnet 36 is excited, it attracts the armature plate 34, and the drag nut 24 is lifted off the threaded spindle 20 counter to the force of the extension spring 38. Due to the mounting of the pivot axle of rocker 32 in the slots 30, rocker 32 does not prevent the manual displaceability of the releasing element 16.

The automatic actuation of the releasing element works as follows:

The electric signal, which upon an accident-related impingement or in case of fire is generated by a sensor or manually by a knob, switches on the current supply of the gear motor 18, on the one hand, and, on the other, briefly excites the electromagnet 36. The electromagnet 36 attracts the armature plate 34 and brings the drag nut 24 out of engagement with the threaded spindle 20. After this brief lifting off of the drag nut 24, the latter comes again in engagement with the threaded spindle 20. The gear motor 18 drives the threaded spindle 20, the latter pulls the drag nut 24 in the direction of the gear motor 18, the drag nut 24 pressing against the vertical edge 22 of the releasing element 16 and pulling the latter along.

In this manner the releasing element 16 is pulled to the left in the drawing until it releases the unlocking mechanism of the catch. After release of the unlocking mechanism, at the end of its movement path, the releasing element 16 actuates a limit switch 40. By the actuation of the limit switch 40, on the one hand, the current supply to the gear motor 18 is switched off, and on the other hand, the electromagnet 36 is briefly excited. The threaded spindle 20 is therefore stopped and the electromagnet 36 briefly lifts the drag nut 24 off the threaded spindle 20. The return springs 28 can now push the releasing element 16 back to the right into the end position shown in the drawing. The catch is now ready again to receive and lock the catch tongue 10.

If during the delay period of e.g. about eight seconds, which the gear motor requires for retracting the releasing element 16 over the entire displacement path, a second electric signal is generated by the sensor, e.g. due to a second impingement in the course of the accident, the electromagnet 36 is again briefly excited by this electric signal. It lifts the drag nut 24 off the threaded spindle 20, so that the return springs 28 can again push the releasing element 16 into its starting position. As soon as the electromagnet 36 releases the armature plate again, the drag nut 24 comes into engagement with the threaded spindle 20 again, and motor 18 begins again to pull the releasing element 16 over a total displacement path. With every impingement within the course of an accident, therefore, the delay period of about eight seconds to the automatic opening of the catch begins to run anew.

Figure 3:
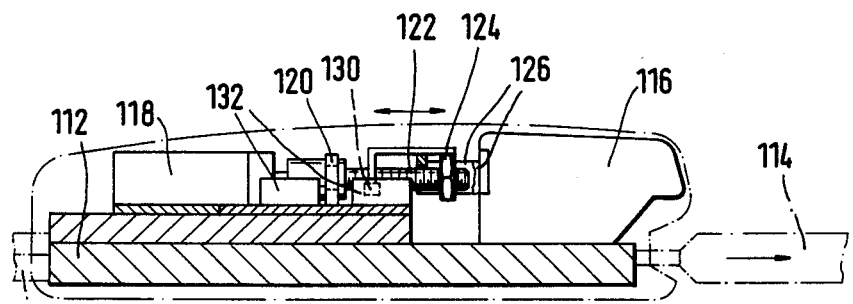
FIG. 3, a vertical longitudinal section through a catch according to a second embodiment.
Figure 4:
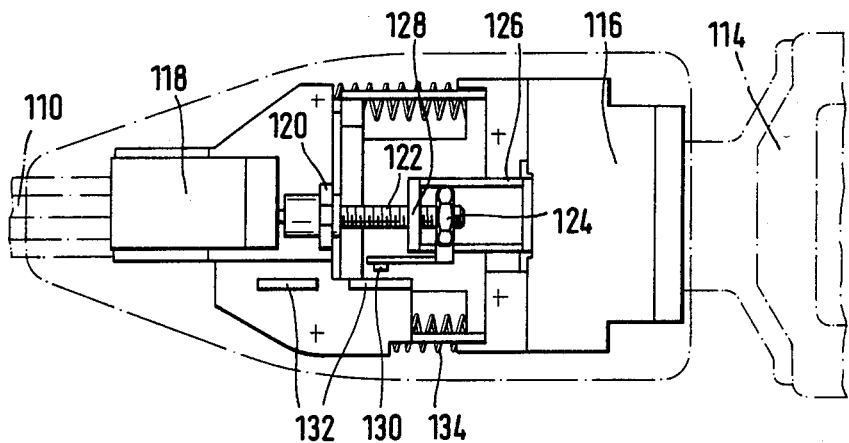
FIG. 4, a plan view of this catch of the second embodiment.

Another embodiment of the catch is illustrated in FIGS. 3 and 4.

The catch comprises a base plate 112, attached to the body of a motor vehicle e.g. by means of a lash 110. The base plate 112 carries the uptake for the catch tongue 114 provided on the safety belt and the locking mechanism, not shown in the drawing, for the tongue 114. The entire catch is surrounded by a housing, which is indicated in the drawing only in its contour. In the housing a pushbutton 116 is provided, which is movable manually by pressure for pushing in the longitudinal direction of the catch. Connected with the pushbutton 116 is a releasing element, not shown in the drawing, which releases the locking of the tongue when the push-button 116 is shifted to the left in the representation of the drawing. As tongue 114 is inserted, a compression spring not shown in the drawing is tensioned, which ejects tongue 114 in the direction of the arrow in FIG. 3 as soon as the locking of the tongue is released.

In these above named features the catch is entirely of a conventional type also in this second embodiment. These features, therefore, are not specifically shown in the drawing and are not specifically described. In particular the design of the locking of the tongue and of the releasing element releasing the locking may be chosen as desired.

At the end of the catch opposite the pushbutton 116, a gear motor 118 with reversible direction of rotation is fastened on the base plate 112. The gear motor 118 is preferably a d-c motor with plugged-on reduction gear. The output shaft of gear motor 18, mounted on the base plate 112 by means of a bearing block 120, drives a threaded spindle 122 extending in the longitudinal direction of the catch.

A drag nut 124 is fitted on the threaded spindle 122. The drag nut 124 is held non-rotationally and axially displaceably between two guides 126 which are secured on the rear end face of the pushbutton 116 and hence also to the releasing element. The free ends of the two guides 126 are joined by a cross-yoke 128 which is traversed by the threaded spindle 122 for fre movement.

At one arm arranged laterally on the drag nut 124 a small magnet 130 is fastened. Magnet 130 acts on two contactless proximity switches 132, which are disposed at the ends of the movement path of the drag nut 124.

The pushbutton 116 and the releasing element firmly connected therewith are held by two return springs 134 in their starting position shown in the drawing.

The catch of this second form of realization operates as follows:

For manual release of the locking of the tongue 114 the pushbutton 116 is shifted by pressure onto its end face in the direction of the double arrow entered in FIG. 3 counter to the force of the return springs 134, until in the left end position the releasing element releases the locking of the tongue and ejects the latter. In so doing the cross-yoke 128 of the guides 126 is pushed freely over the threaded spindle 122 and moved away from the drag nut 124 to the left. When the pushbutton 116 is let go again, it is moved by the return springs 134 into its starting position again, as shown in the drawing, so that the catch is ready to function for renewed introduction and locking of the catch tongue 114.

If an electric signal for automatic release of the catch is generated by a sensor, the gear motor 118 is set in motion. In the case of a signal generated by a fire or water sensor, the gear motor 118 is set in motion immediately, but in the case of a signal generated by an inertia sensor only after a given delay period after this signal or respectively after the last of several successive signals.

Gear motor 118 drives the threaded spindle 122, owing to which the drag nut 124 which is held non-rotationally and axially displaceably in the guides 126 moves to the left. In so doing, the drag nut 124 comes to bear against the cross-yoke 128 and via it and the guides 126 pulls the pushbutton to the left. At the end of this movement path, the releasing element connected with the pushbutton 116 unlocks the tongue, so that the latter is ejected.

As soon as the tongue has been ejected, at the end of the movement path of the drag nut 124 the magnet 130 connected with the latter gets into the region of the proximity switch 132 at left in the drawing, actuating it. By the actuation of the left proximity switch 132 the direction of rotation of the gear motor 118 is reversed, so that the drag nut 124 moves to the right again. The pushbutton 116 follows this movement due to the pressure of the return springs 134, until it has reached its starting position again. As soon as the drag nut 124 has reaches its right-hand end position shown in the drawing, the magnet 130 connected with the drag nut 124 gets into the region of the right proximity switch 132, actuating it. By the actuation of the right proximity switch 132 the gear motor 118 is stopped and its direction of rotation reversed again.

Thus the catch is again ready for use for the uptake and locking of the tongue as well as for manual or automatic release.

Although the present inventon has been described in some detail by way of illustration and example for purposes of clarity and understanding, it will, of course, be understood that various changes and modifications may be made in the form, details, and arrangements of the parts without departing from the scope of the invention as set forth in the following claims.

What is claimed is:

1. An improved catch for safety belts of air, water and land transport means embodying releasable locking of the catch tongue with a releasing element which by means of a pushbutton is manually movable to slide in a forward direction counter to the force of a return spring and at the end of its movement path releases a locking mechanism, and further embodying an automatic release system controllable by an electric signal generated by a sensor and having an electromechanical drive which subjects the releasing element to traction in said forward direction, the automatic release operation occurring in response to the electric signal generated by the sensor after a given delay period, such delay period starting anew after each signal if several signals occur successively within the delay period, comprising: an electro-mechanical drive in the form of a gear motor having a threaded spindle (20, 122) rotatable thereby; a drag nut (24,124) provided on the threaded spindle and bearing against said releasing element; said drag nut being movable in said forward direction by the rotation of said spindle to thereby slide said releasing element to the end of its movement path to release said locking mechanism, said drag nut releasing said releasing element for movement by said pushbutton; and a switching element (40, 36, 132) which upon release of said locking mechanism acts on the gear motor (18, 118) to restore it to its starting condition prior to the electric signal generated by said sensor.

2. The improved catch according to claim 1, wherein said drag nut (24) engages with the threaded spindle (20) over less than half the circumference and is adapted to be lifted off said threaded spindle, and said drag nut (24) being disposed at one arm of a rocker (32), the other arm of which having an armature plate disposed opposite an electromagnet (36) excitable by the electric signal of the sensor.

3. The improved catch according to claim 2, wherein said electromagnet (36) is excitable additionally by an electric signal which is generated by said switching element (40) acting on said gear motor (18).

4. The improved catch according to claim 1, wherein the direction of rotation of the gear motor (118) is reversible, and that the reversal can be triggered at the ends of the movement path of the drag nut (124), to positively bring the catch back to its starting position ready for use after an automatic release.

5. The improved catch according to claim 4, including means for detecting the ends of the movement path of the drag nut (124).

6. The improved catch according to claim 4, wherein said drag nut (124) is arranged non-rotationally and axially displaced in a guide (126) connected with the releasing element and pushes against a cross-yoke (128) of the guide (126) for pulling the releasing element in said forward direction.

7. The improved catch according to claim 6, wherein said guide (26) is provided at a pushbutton (116) connected to said releasing element.

8. The improved catch according to claim 4, wherein there are arranged switching elements at both ends of the movement path of the drag nut to be actuated by said drag nut.

* * * * *